Aug. 1, 1939.  I. R. COSBY ET AL  2,167,744
SAW ARBOR
Filed June 15, 1938
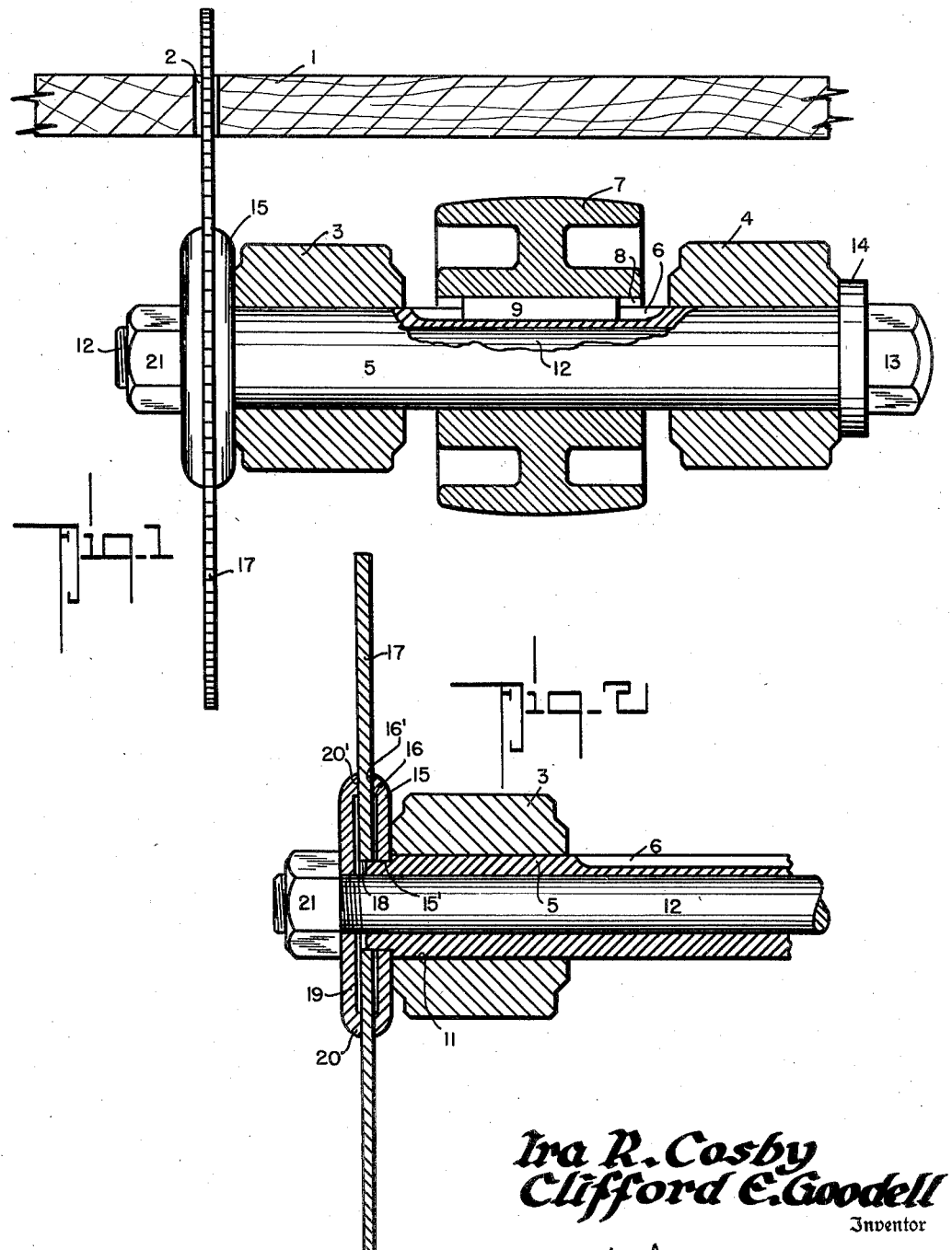
Ira R. Cosby
Clifford E. Goodell
Inventor
By Holbert E. Smith
Attorney Patented Aug. 1, 1939

2,167,744

UNITED STATES PATENT OFFICE 2,167,744

SAW ARBOR

Ira R. Cosby and Clifford E. Goodell,
Spokane, Wash.

Application June 15, 1938, Serial No. 213,813

2 Claims. (Cl. 143—155)

Our present invention relates to improvements in saw arbors and more particularly to saw arbors for rotary or circular saws of the removable type.

The primary purpose of this invention is to provide means whereby the rotary saw may be removed with facility from the arbor for sharpening, repair, or substitution, without resort to the present tedious method of removing the slotted, hinged, saw table through which the saw operates.

According to our invention hereinafter more fully described and claimed, the saw is supported by a disk on the end of a bolt extending longitudinally of a tubular arbor, and the saw may be removed simply by first removing a nut on the end of the bolt thereby releasing the saw after which the saw is lifted through the slot in the saw table. New or substitute saws may be mounted in the reverse manner.

In the accompanying drawing we have illustrated one complete example of the physical embodiment of our invention according to one mode we have thus far devised, but it will be understood that changes and alterations may be made in the exemplified structure within the scope of the appended claims.

In the drawing, Figure 1 is a side elevation, partially in section, showing the saw arbor and the operating pulley therefor.

Figure 2 is a vertical sectional view of the structure involved in mounting the saw on the arbor.

Referring now to the drawing, Figures 1 and 2, 1 illustrates a saw table of the usual description except that the table when used with the structure of our invention need not be hinged, the table having a saw slot 2 extending vertically therethrough.

Below the saw table 1 are indicated spaced bearings 3 and 4 in which the tubular saw-arbor 5 is journaled, and the arbor is fashioned with an exterior, longitudinally extending groove or key-way 6 forming part of the mount for the pulley 7 that is located between the spaced journal bearings 3 and 4.

Because of the narrow width of the saw table slot 2, it will be apparent that the saw while fixed in its upright, operating position, cannot be withdrawn from the arbor, and ordinarily as in structures now in use, a hinged table must be employed in order that the saw may be removed from the arbor.

The pulley 7 is adapted to be driven by a belt in any desirable manner, and the central bore 7' of the pulley is provided with a longitudinally extending groove 8 adapted to be alined with the groove 6 of the arbor, and a key 9 is provided to engage the complementary grooves 6 and 8 which form a key-way, and thereby retain the pulley and arbor in power transmitting relation.

For mounting the saw, the tubular arbor 5 is provided at the saw end with a reduced centering portion or shank 10 forming an annular shoulder 11, and within the arbor we employ a bolt 12 having an exterior head 13 and provided with a washer 14 adapted to rotatably engage the outer face of bearing 4.

On the reduced, or shank end 10 of the arbor 5 which projects beyond bearing 3, we utilize a convex washer or disk 15 having a central opening 15' mounted on the end shank 10 of the arbor. The washer or disk 15 is formed with an inturned circumferential flange 16 having a vertical face 16'.

On the extreme end of the shank of the arbor beyond the inner clamp disk 15 we mount the rotary saw 17 having a central opening 18 as indicated in Figure 2. The saw is centered and supported on the end shank of the arbor only through the medium of a portion of the thickness of the saw, a portion of the wall of the saw opening 18 overlapping the end of the arbor. Inasmuch as the opening 18 of the saw is substantially the same diameter as the end shank 10 of the arbor, it will be apparent that only through such an arrangement can the saw be removed from the arbor by any means other than moving the saw longitudinally, and while the saw is in upright position such a movement is prevented by the limited width of the slot 2.

Exterior of the saw, we utilize another convex washer, or clamp disk 19 having a central opening 19' and mounted on the end of the bolt 12. This disk 19 is also provided with a circumferential flange 20 having a vertical, plane face 20'. The faces 16' and 20' respectively, of the opposed washers or clamp disks, frictionally engage the opposite faces of the saw, and furnish the power transmitting means from the arbor to the saw. The clamp nut 21 threaded on the bolt 12, retains the assembly in proper position.

In mounting the saw in place, the circular saw 17 is lowered through slot 2 of the saw table 1, the nut 21 and washer 19 having been removed from the bolt. Clamp disk 15, however, is in proper position on the shank 10.

The saw is then centered on the arbor 5, the opening 18 of the saw engaging the reduced shank 10 of the arbor with a portion of the wall of opening 18 overlapping or projecting beyond the end of the arbor. The saw is then manually held in position by the operator, and the clamp disk 19 is placed on the end of the bolt 12 after which the nut is turned to force the assembly of the saw and the disks into engagement, frictionally, with and against the annular shoulder 11 of the arbor.

The faces 16' and 20' of the disks 15 and 19, frictionally engage the opposite faces of the saw 17 and maintain the latter securely in position on the end 10 of the arbor.

In dismounting the saw, nut 21 is released and the nut and disk 19 are removed. The saw 17 is then swung slightly to the left in Figures 1 and 2, being fulcrumed at or about the slot 2 of the table 1, and the saw is then lifted off of the arbor and out through slot 2, and another saw may then be substituted by the above described method.

It is believed apparent that by the utilization of our invention, the task of removing or changing a rotary saw is materially reduced, and the time and labor involved are decreased to about ⅓ of the time required under the present methods.

The invention also provides an arbor which is inexpensive to manufacture and mount, is simple in construction and operation, and which is readily adaptable for use on either new or old types of rotary saw machines.

Having thus fully described our invention, what we claim as new and desire to secure by Letters Patent is:

1. A circular saw mounting including a tubular arbor having a reduced end forming an annular shoulder, a clamp disk on said end and bearing against said shoulder, a bolt extended through said arbor, a clamp disk on said bolt, a saw blade having a central opening supported on said reduced end intermediate said disks, and means for retaining said saw and disks in power transmitting relation.

2. A circular saw mounting including a tubular arbor having a reduced end forming an annular shoulder, a clamp disk on said end and bearing against said shoulder, a bolt extended through said arbor, a clamp disk on said bolt, a circular saw having a central opening and said saw adapted to be supported on said reduced end by a portion of the thickness of the saw intermediate said disks, and means for retaining said saw and disks in power transmitting relation.

IRA R. COSBY.
CLIFFORD E. GOODELL.